Sept. 27, 1927.  R. PEALE  1,643,786
CONVEYER MECHANISM
Filed March 1, 1920  6 Sheets-Sheet 2

Richard Peale INVENTOR
BY John D. Morgan ATTORNEY

Sept. 27, 1927.

R. PEALE

CONVEYER MECHANISM

Filed March 1, 1920    6 Sheets-Sheet 4

INVENTOR
Richard Peale
BY
John D Morgan
ATTORNEY

Patented Sept. 27, 1927.

1,643,786

UNITED STATES PATENT OFFICE.

RICHARD PEALE, OF ST. BENEDICT, PENNSYLVANIA, ASSIGNOR, BY MESNE ASSIGNMENTS, TO REMBRANDT PEALE, W. SANDERS DAVIES, AND WILLIAM S. WALLACE, TRUSTEES.

CONVEYER MECHANISM.

Application filed March 1, 1920. Serial No. 362,239.

The invention relates to conveyers for loose materials, and more especially in certain features thereof to such conveyers constructed and operating around curves or upon a non-straight path.

Objects and advantages of the invention will be set forth in part hereinafter, and in part will be obvious herefrom, or may be learned by practice with the invention, the same being realized and attained through the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The conveyer of the present invention is intended and adapted to meet all the usual conditions, activities and requirements of coal mining, especially to meet such conditions and requirements where the vein or seam is exceedingly or unusually thin. In such thin veins the problem of conveying the loose or dislodged coal from the working faces, where it is primarily dislodged from the solid coal of the vein, to the entry or heading is exceedingly difficult.

By the present invention a conveyer is provided adapted to be set up and to operate in exceedingly thin veins, and which is capacitated for universal service in a mine for carrying the coal back from the advancing working face of the rooms, from the cross-cuts or break-throughs communicating from room to room through the intervening pillars, from the retreating or pillar drawing work between completed rooms, from the entry face and also for operating along an entry as a general conveyer into which the room conveyers and other conveyers discharge. It is also adapted for use in the various locations and phases of long wall work, as will be clear without further detailed explanation.

The conveyer mechanism realizes or attains its enumerated almost universal capacities and functions largely by being adapted or capacitated for making both horizontal and vertical turns or curves, such as are required in conveying coal away from break-throughs, cross-cuts, pillar or retreat work, and certain phases or kinds of long-wall work as well.

In construction, the conveyer is simple and sturdy, requiring little supporting or auxiliary structure, easily set up and taken down, readily extensible sectionally or by units as the working faces advance, and needing practically no attention. By the use of my conveyers veins of as low as two feet or even less are rendered practicable for work.

It will be understood that while the applicability and objects of the invention in connection with coal mining under certain conditions have been set forth, the invention is not so limited, such application of the invention to coal mining being described by way of explication and not as restricting the invention.

Great advantages are realized, however, over the ordinary methods of operating room cars in thin veins. The invention obviates the objections and drawbacks of the usual methods by reason of their expense, and the mechanical difficulty of laying tracks and providing suitable cars, and the great hardship imposed on workmen in traveling to and fro in the low veins in pushing and handling the cars. Laborers not infrequently absolutely refuse to perform such work on account of its hardship. The cost of excavating either the top or bottom rock in rooms and general long wall work is practically prohibitive, and this is much more the fact in especially thin veins.

While especial advantages have been recited as to the use of the invention in relatively thin coal seams, it will be understood that its use will be found equally advantageous in higher seams, and that the invention is also applicable to general conveyer work outside of coal mines, as already stated.

Referring to the details of the particular embodiment illustrated by way of example in the accompanying drawings, the conveyer or conveying mechanism comprises a conveyer body or trough or conduit 1, provided with a bottom 2 and with sides 3 and 4, the conveyer body being open at the top. The conduit is preferably of angular cross sectional shape and also preferably has the vertical sides somewhat angled or flared outwardly towards the top or open side of the conduit. The material of which the conduit is constructed is immaterial, so far as concerns many features of the invention, and it can be made of boards, sheet metal, or other suitable material.

The conduit is designed for extensibility, and this preferably by regular units of length. With this in view, the conduit body or conveyer body is constructed so that sections may be added thereto as the work advances, to keep the head or inner end of the conduit within easy and efficient reach or location with respect to the dislodged coal and working face of the room or other work. No supporting structure is shown for the conduit in the drawings, the same being omitted for the sake of clearness, although little auxiliary structure is actually necessary. The conduit body may rest upon the mine bottom, be fastened to the roof props, or may have separate supports or holding devices of its own, as may be found necessary, or convenient, or desirable.

Figure 1:
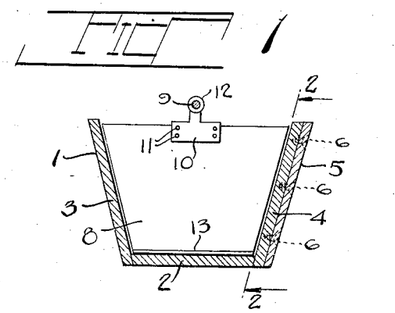
Fig. 1 is a vertical transverse section through a conveyer constructed in accordance with the invention.
Figure 2:
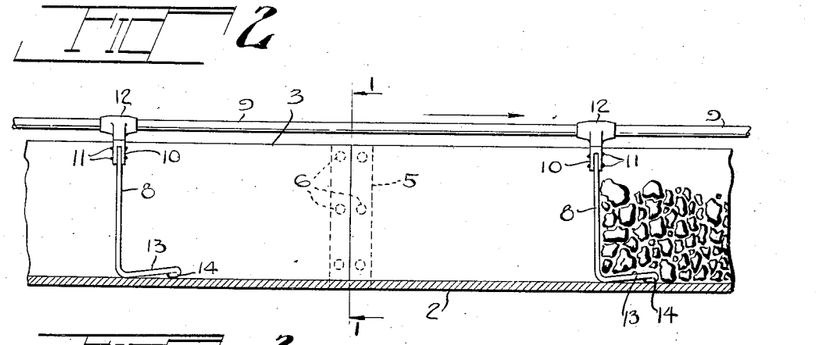
Fig. 2 is a vertical longitudinal section through the conveyer, on the line 2—2 of Fig. 1.

In Figs. 1 and 2 the ends of two sections of the conduit or conveyer body are shown abutting on each other, and held together and in alinement with each other by plates 5, which are fastened to the abutting conveyer body sections by suitable devices, such as screws 6.

The material forwarding or traveling means operating within the conveyer body in the herewith embodied form comprise a series of equally spaced apart blades, the blades being positioned vertically within, and transversely filling, the conveyer body, and sliding along therewithin. The blades are connected to a propelling cable, preferably attached thereto at or near the tops thereof.

Referring to the illustrated exemplary construction in detail, a series of blades 8 are equally spaced apart within the conveyer body 1 at right angles thereto and substantially fitting or filling the conveyer body with easy clearance so that the blades will slide along within the conveyer. The propelling means or forwardly traveling means for these pusher blades 8 comprise the endless cable 9, which is disposed centrally above the conveyer body, the blades 8 or upward extensions therefrom being fixed to the cables. The illustrated form of attaching means between each blade and the cable (Figs. 1 and 2) comprises a slotted plate 10, embracing the top central portion of the respective pusher blades 8, and fastened thereto by suitable means, such as the rivets 11. Said fastening means each also comprise a cylindrical portion 12, grasping or embracing the propelling cable 9, and fastened thereto in suitable manner, as by being soldered or clamped thereto, or otherwise.

Means are provided for maintaining the blades 8 in their proper and efficient position as they are traveled along with their loads longitudinally of and within the conveyer body, such means preventing the blades from turning or twisting laterally or horizontally or lifting vertically, and especially preventing their swinging or angling backwardly under the weight and resistance of the propelled coal or other material. Said means are also designed, in accordance with one feature of the invention, for holding the pushing blades 8 in position when the conduit describes a horizontal turn or curve and for guiding and carrying them around the curve, as will be more fully described at a later point herein. As embodied, said means comprise a foot or apron 13, connected to the bottom of the blades 8, and resting upon and projecting forwardly along the bottom of the conveyer body from the pusher blade, the foot or apron 13 being preferably integral with the blade. In Fig. 2 the foot 13 is shown with the forward edge 14 thereof upset or turned back on itself to prevent the pusher blade catching upon any uneven parts or places in the conveyer body and to effect smooth and easy sliding therebetween. The foot 13 also reduces the friction by supporting the coal and thereby reduces the power required.

The foot 13 is also designed to maintain the pusher blades 8 in proper position in going around a horizontal curve in the conveyer body, and for this purpose the side edges 15 and 16 of the foot 13 are inclined or curved forwardly from the blade 8 and inwardly or away from the sides 3 and 4 of the conveyer body to such degree, and of such shape, that in going about a curve they will guide the respective blades 8 and maintain them in proper and efficient transverse position with respect to the conveyer body and prevent vertical swinging of the blades out of proper transverse position. The action of the propelled loose material upon the foot 13 of the pusher plate or blade 8 in holding the plate or blade from vertically swinging or lagging backwardly in the conveyer body is clearly shown at the right in Fig. 2.

Figure 3:
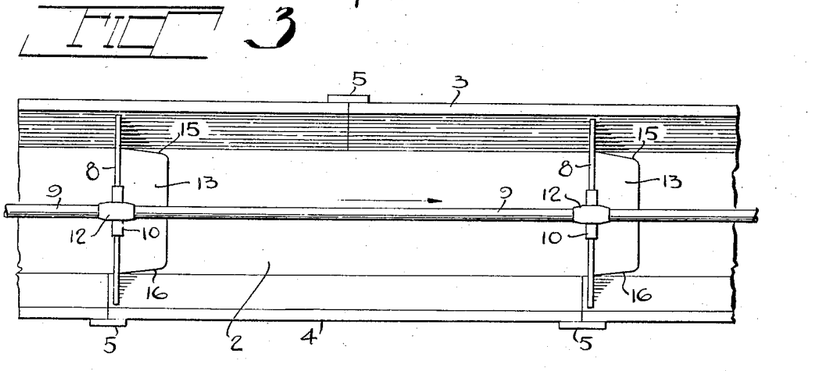
Fig. 3 is a top plan corresponding to Figs. 1 and 2.
Figure 4:
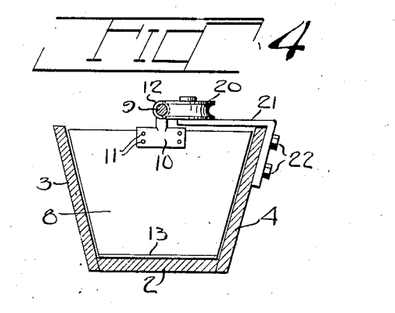
Fig. 4 is a section similar to Fig. 1, but showing one form of guiding devices for a horizontal curve in the path of the conveyer, taken substantially on line 4—4 of Fig. 7.

In Figs. 4 to 7 inclusive, the conveyer is shown passing around a horizontal curve, which is substantially or quite a right angle. The general construction of the here embodied form of horizontally curved conveyer may be substantially similar in its essentials of structure to that shown in Figs. 1 to 3 and need not be described again in detail. In connection therewith, however, means are provided for holding or guiding the cable 9 in a proper central arcuate path over the top of the conveyer body about the curve and in proper position to carry around the curve the attached pusher blades 8. As embodied (Fig. 4), a series of sheaves 20 are mounted upon brackets 21, which brackets are supported upon and fastened to the side 4 of the conduit body by suitable means, such as screws or bolts 22.

Figures 5, 6, 7:
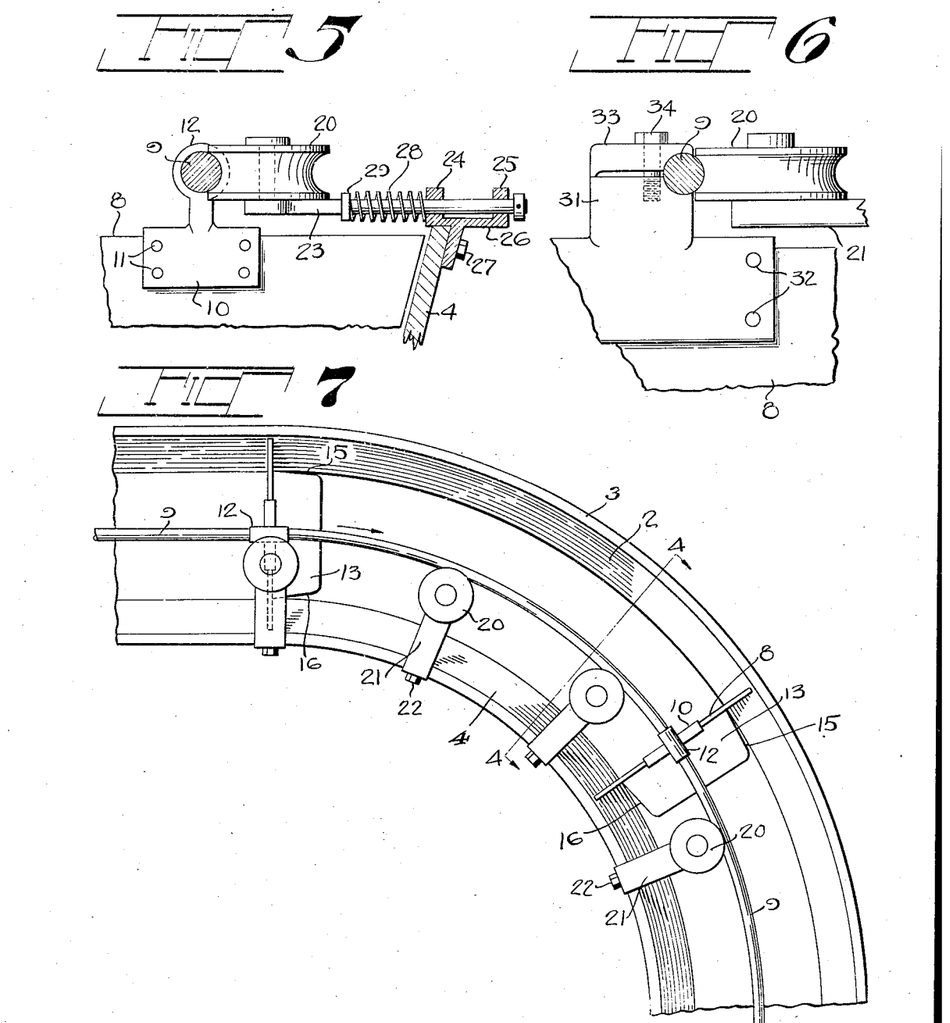
Fig. 5 is a detail of a different form of guiding sheave or roller.
Fig. 6 is a fragmetary detail of one form of the means for attaching the blades to the cable.
Fig. 7 is a top plan of the conveyer making a horizontal curve with the mechanism substantially the same as shown in Fig. 4.

In the detail construction shown in Fig. 5, the sheaves 20 are adapted to yield when the pusher plate or blade attaching means 12 are encountered thereby, and to snap back into engagement with the cable 9 after the respective parts 12 have passed. In said figure a sheave 20 is rotatably supported upon an arm 23, the rear portion of which arm is longitudinally slidably mounted in lugs or projections 24 and 25 which are fixed or supported on a bracket 26. The bracket 26 is fastened to the side 4 of the conveyer by any suitable means, such as screws or bolts 27. To effect the resilient action between the sheave and cable, a spring 28 is coiled about the arm 23, and is in compression between the lug 24 and a collar 29 fixed on the arm 23. This gives the requisite resilient action as described.

In the detail construction shown in Fig. 6, a form of attaching device between the blades 8 and the cable 9, is provided which is especially useful where the conveyer curves in one direction only. In this form the body 31 of the attaching device is fastened to the blades 8 by suitable means such as rivets 32. The cable 9 is grasped or clamped at one side of the upper part of the attaching means 31, a jaw 33, taking over the cable, and a bolt 34 screwing the jaw 33 down into clamping relation with the cable 9.

The guiding or alining action of the edges 15 and 16 of the foot 13 of the pusher plates or blades 8 in going about the curve may be noted from Fig. 7, and will be understood from inspection and from the previous description.

Figures 8, 10:
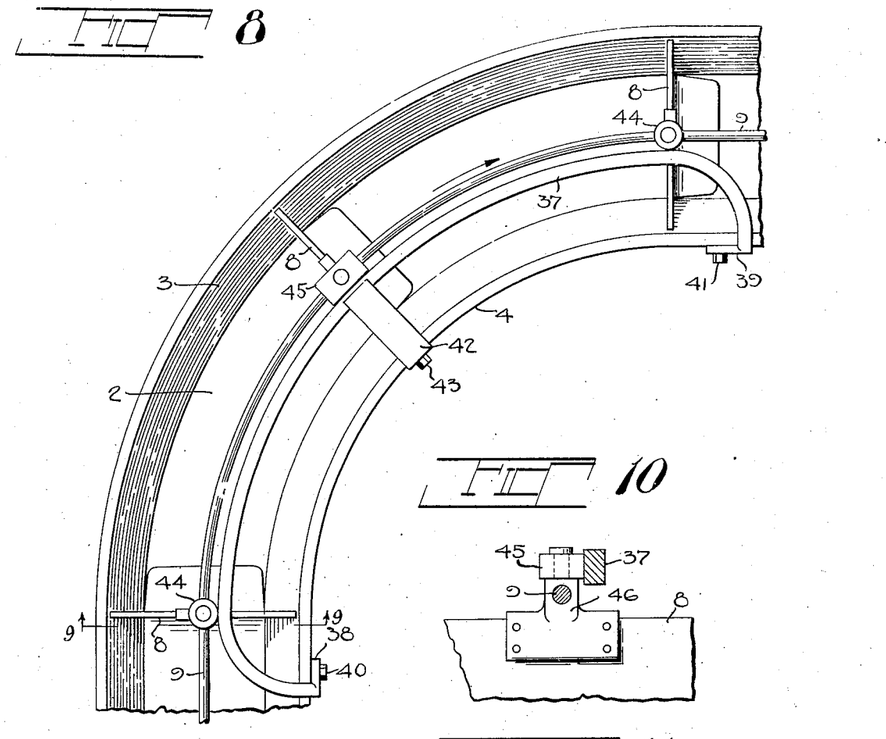
Fig. 8 is a top plan corresponding to Fig. 7 but showing a different form of guiding means at a horizontal curve.
Fig. 10 is a fragmentary detail corresponding to the top central portion of Fig. 9 but showing a somewhat different form of part of the guiding devices.
Figure 9:
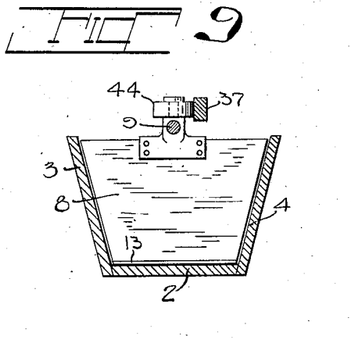
Fig. 9 is a vertical section taken on line 9—9 of Fig. 8.

In Fig. 8 a somewhat different form of means for guiding the conveyer mechanism about a curve is shown. In said figure a guide rail 37 is supported upon the side 4 of the conveyer body by suitable means, such as plates or brackets 38 and 39, fastened respectively by bolts or screws 40 and 41. An additional supporting bracket 42 is shown near the central part of the rail 37, said bracket being fastened to the side of the conveyer by bolts or screws 43. The rail 37 curves outwardly over the conveyer, and the operative part of the rail is arcuate in form and is located substantially centrally of the arc of the conveyer throughout the curve. That is, it describes the path which the upper central part of the pusher plates should take in passing around the curve. Means are provided upon the cable 9 or upon the upper part of the plates 8, or upon the connection between each plate 8 and the cable 9 for engaging with the rail 37, whereby the cable and pusher plates are symmetrically and properly guided around the curve. Such means are preferably fastened to the heads of the pusher blades 8, to maintain the blades in properly changing angular position in going about the curve. In the details of the form thereof illustrated in Fig. 9 rollers 44 are horizontally disposed and rotatably mounted on the heads of the pusher blades 8 so as to engage with the side of the rail 37, the radial tension on the cable 9 keeping the rollers in position against the rail.

Figure 11:
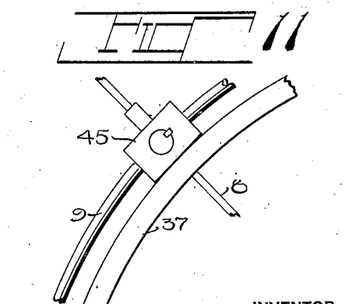
Fig. 11 is a top plan corresponding to Fig. 10.

In Figs. 10 and 11 a somewhat different form is shown. In said form an elongated block 45 is fixed to the head 46 of the pusher plate or blade 8, the block 45 being likewise held to the rail 37 by the radial pressure upon the cable 9. The long bearing surface on the side of the block 45 pressing against the rail 37 as shown in Figs. 10 and 11, will prevent any undesirable vertical swinging or angular displacement of the blades 8, and will act to keep the blades 8 in right angled relationship to the particular point or place in the rail 37 where they may be respectively at any instant, this action being maintained all the way around the curve, and with each of the pusher blades 8, respectively.

Figure 12:
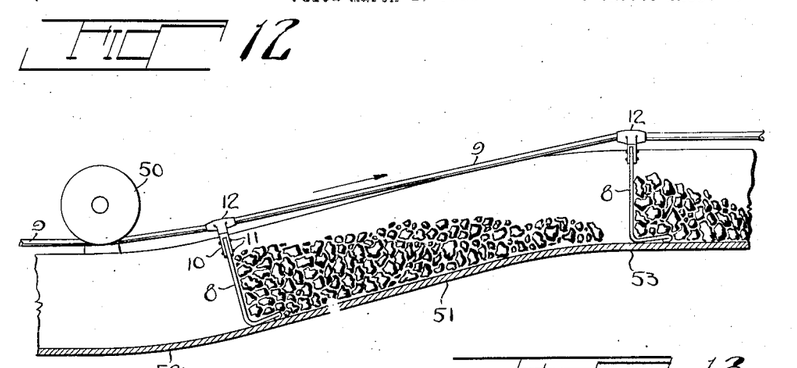
Fig. 12 is a vertical longitudinal section, generally similar to Fig. 2 but showing the conveyer making a vertical curve.

Means are likewise provided by the invention cooperating with the general conveyer mechanism to permit the operation thereof past or over vertical curves. Fig. 12 of the drawings is a section corresponding to Fig. 2, except that it shows a vertical curve in the conveyer, that is, a change in the horizontal level of one portion of the conveyer with respect to another portion thereof. In the embodied form of means for effecting the travel of the conveyer or conveyer mechanism past a vertical curve, a sheave 50 is shown bearing from above upon the cable 9, the sheave being located at the bottom or lower end of such a vertical curve. This sheave 50 will maintain the cable 9 at a proper height with respect to the conveyer body to the left of the sheave in Fig. 12, it being assumed in Fig. 12 that the cable 9 and pusher plates 8 are traveling to the right. The same is true with respect to the stretch or reach of the cable 9 which is running at any given time over the upwardly inclined portion 51 of the conveyer body. At the upper end 53 of the vertical curve, the pusher plates 8 sliding along the bottom of the conveyer body will act as a support to the cable 9, which will thus be at the proper level for the horizontal portion of the conveyer extending on from the right hand end of Fig. 12. The action of the foot 13 of the respective pusher plates 8, in a vertical curve in the conveyer will be understood from Fig. 12 of the drawings.

In accordance with one feature of the invention, and especially as adapting it for use in thin seams or veins of coal (although this feature will be found useful elsewhere also) the return or idle reach of the conveyer is horizontally disposed, that is, is substantially upon the same level with the loaded or working reach of the conveyer mechanism, which has just been described. The embodied form of the driving means for the system is shown cooperating with such a construction and arrangement of the return reach of the conveyer mechanism.

Figure 13:
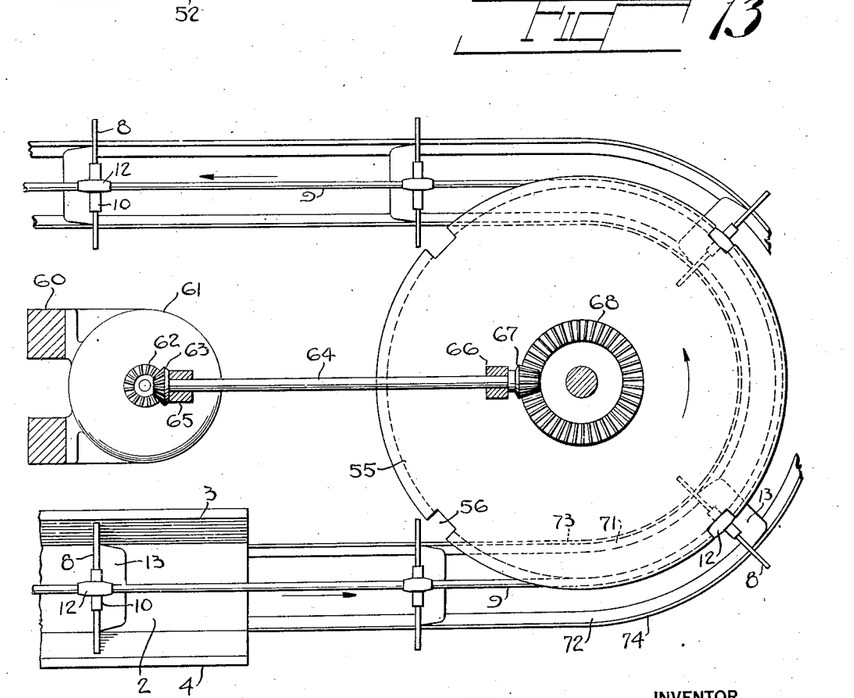
Fig. 13 is a top plan of one end of the conveyer line or system showing the discharge for the material, the drive for the conveyer, and other features.
Figure 14:
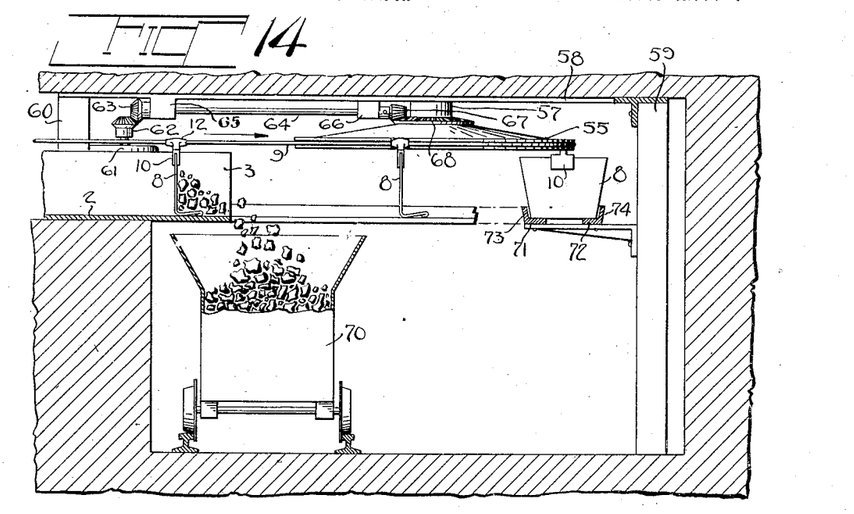
Fig. 14 is an elevation looking at Fig. 13 from the left.
Figure 15:
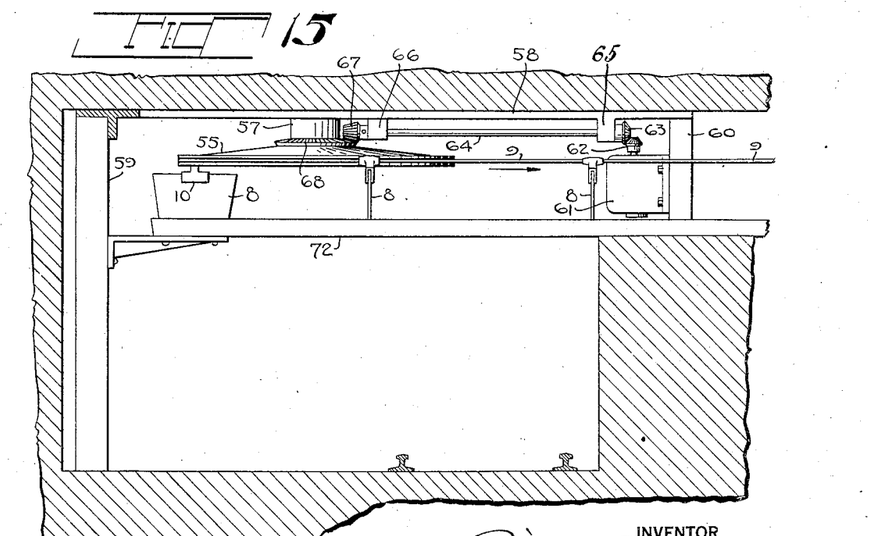
Fig. 15 is an elevation looking at Fig. 13 from the right.

Referring to both the above-mentioned features of the invention in detail, as herein embodied, the driving means comprises a horizontally disposed peripherally grooved wheel or sheave, 55, having recesses 56 in the periphery thereof, which recesses engage with the blocks 45, rollers 44, clamps 12, or other devices upon the cable 9 which serve as the means for fastening thereto the pusher blades 8. The wheel or sheave 55 takes the cable 9 into its grooved rim, the blocks 45 at the same time fitting into the recesses 56. Thus the cable 9 and the entire system of pusher plates 8 with their load are traveled along the conveyer body as sheave 55 rotates. The sheave 55 is mounted in a suitable manner, and, as shown in Figs. 14 and 15, it is provided with a hanging top journal bearing 57 carried from a plate 58 supported by props 59 and 60. Suitable driving means for sheave 55 are provided, and as shown in Figs. 13, 14 and 15, a motor 61 has fixed to the shaft thereof a bevel gear 62, which meshes with a bevel gear 63 fast on shaft 64. Shaft 64 is carried in bearings 65 and 66, fixed to or supported from the plate 58. A beveled gear 67 fixed on shaft 64 meshes with a gear ring 68 fixed to the sheave 55.

Suitable means are provided for discharging the coal or other loose material from the conveyer mechanism, and as embodied or illustrated in Fig. 14, a car 70 is shown in the entry or heading, the coal falling directly thereinto where the conveyor body bottom terminates. It will be understood that instead of mine cars an entry conveyor system may be employed, and in actual practice this will usually be found preferable.

Referring now in detail to the exemplified form of the return reach of the conveyer, the blades 8 are shown running along two parallel bottom rails 71 and 72, which rails have vertical projections 73 and 74 for holding the blades laterally in position. There is no need for the full construction of conveyer body on the return reach or stretch of the conveyer, in which the plates 8 are running idle. At the inner end of the conveyer is a sheave 75, corresponding in construction and function to the sheave 55, except that it is not driven but acts merely as an idler or guiding sheave. The sheave 75 will be mounted so that it can be easily and expeditiously moved forwardly or rearwardly from time to time with the progress of the work, and with the addition to the conduit mechanism of new sections as the face of the work advances, or the removal therefrom of sections as the work retreats, as in pillar drawing. The cable 9 will also be in sections, connected together by suitable clamps, and such cable sections may have the pusher blades 8 permanently fixed thereto and regularly spaced apart therealong. The attachable and detachable lengths of the cable 9 will be in integral units of the spacing apart of the pusher plates 8, and the sections of the conveyer body will be of corresponding length. This furnishes an ideal, simple and exact form of put-up and knock-down extensible and retractable conveyer system.

Figure 16:
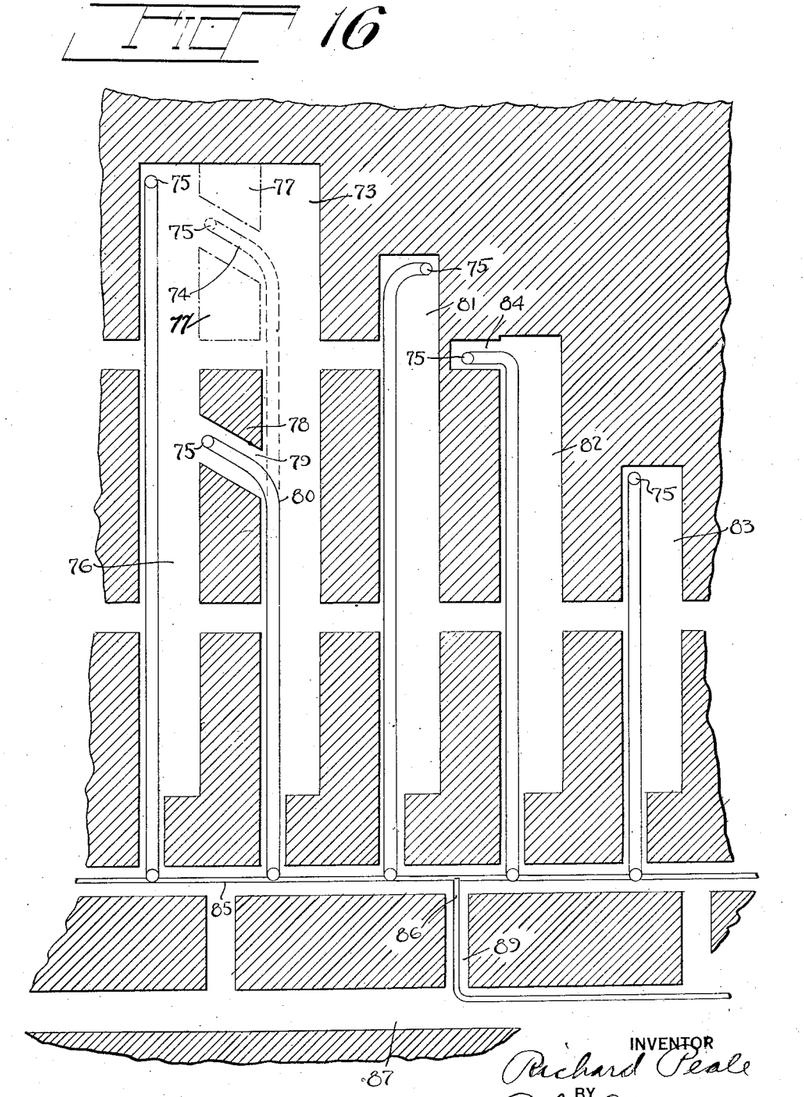
Fig. 16 is a general top plan of the conveyer, more or less diagrammatic in character, shown applied to a mine and to different locations, phases and stages of mining.

In Fig. 16 of the drawings, the hereinbefore described conveyer system is shown diagrammatically applied to a group of rooms together with the entry and its air way. In this figure the first room 76 is assumed to have gone its full length, the final position of the head or inner end of the conveyer system being indicated by the sheave 75 in full line. This is also the case as to the second room 73. 77 indicates a "drawn" or excavated pillar, and the conveyer system is shown at 74 in dotted lines as passing thereinto to receive the coal. The second pillar 78, which would be the next to be drawn, is shown with a diagonal passage 79 therethrough, the conveyer system 80 being shown installed in the passageway 79 preparatory to receiving the coal as it is dislodged from the pillar. The remaining rooms 81, 82 and 83 are shown with their conveyer systems of various lengths, corresponding to the degree of advance of the different rooms, and illustrating the extensibility of the system. In room 82 the conveyer system is shown turned into the break-through or cross cut 84 which in this instance is driven toward the room 81. An entry conveyer system 85 is shown into which the various room conveyer systems discharge their coal. This is a preferable service in the entry, as it requires no planning or attendance of workmen to receive the discharged coal from the room conveyer systems, but the entry conveyer automatically takes care of the coal from the face of the entry and from the room conveyers at all times. At 86 a conveyer is shown conveying coal from the air way 87, passing through the cross-cut or break-through 89, and discharging into the entry conveyer 88. Thus the entry, the companion air way, and the group of rooms, including all cross-cut and retreat work or pillar drawing are all served by the automatic conveying system.

It will be understood that the invention is not limited to the details of construction herein shown and described, but that changes may be made therein without departing from the principles of the invention or sacrificing its chief advantages.

What I claim is:—

1. A conveyer mechanism including in combination a conveyer body having a bottom and sides, a plurality of vertical material pushing conveyer blades fitting and sliding within the conveyer body, a cable to which the blades are attached, means for driving the cable, said blades having at their bottom edges a forwardly extending foot sliding along the bottom of the conveyer body, said foot being narrowed inwardly from the vertical edges of the blade and away from the side walls of the conveyer body.

2. A conveyer mechanism including in combination a conveyer body having a bottom and sides, a plurality of vertical material pushing conveyer blades fitting and sliding within the conveyer body, a cable to which the blades are attached at the central upper part of the blades, means for driving the cable, said blades having at their bottom edges a forwardly extending foot beneath the conveyed material and sliding along the bottom of the conveyer body said foot being narrowed inwardly from the vertical edges of the blade and away from the side walls of the conveyer body.

3. A conveyer mechanism including in combination a conveyer body having a bottom and sides, a plurality of vertical material pushing conveyer blades fitting and sliding within the conveyer body, a cable to which the blades are attached at the central upper part of the blades, means for driving the cable, said blades having at their bottom edges a forwardly extending foot beneath the conveyed material and sliding along the bottom of the conveyer body, said foot being narrowed inwardly from the vertical edges of the blade and away from the side walls of the conveyer body.

4. A conveyer mechanism including in combination a conveyer body having a bottom and sides and a vertical material pushing blade fitting and sliding within the conveyer body and having a forwardly extending foot sliding along the bottom of the conveyer body, the conveyed material resting thereupon and being confined thereto by the conveyer sides, said foot being narrowed away from the blade and from the conveyer side walls, and means for traveling the blade along within the conveyer body.

5. A conveyer mechanism including in combination a horizontally curved conveyer body having a bottom and side walls, a plurality of spaced apart vertical material pushing blades fitting across and sliding within the conveyer body, a foot extending forwardly from the bottom of the blades and having its side edges shaped to maintain the blade in position within the conveyer body, a cable connected to the blades at their central upper parts, and means for maintaining the cable in its path centrally over the conveyer body in passing around the curve.

6. A conveyer mechanism including in combination an endless cable traveling in a horizontal path, a conveyer body extending along one reach of the conveyer path and having a bottom and sides, a plurality of blades fitting across within and sliding along the conveyer body, and connected to the cable in spaced relationship, and means for guiding the blades back from the discharge end to the initial end of the conveyer body.

7. A conveyer mechanism including in combination an endless cable traveling in a horizontal path, a conveyer body extending along one reach of the conveyer path and having a bottom and sides, a plurality of blades fitting across within and sliding along the conveyer body, and connected to the cable in spaced relationship, and means including a guide rail for the bottom of the blades for guiding the blades back from the discharge end to the initial end of the conveyer body and discharge means for the conveyed material at the discharge end of the conveyer.

8. A conveyer mechanism including in combination an endless cable traveling in a horizontal path, a conveyer body extending along one reach of the conveyer path and having a bottom and sides, a plurality of blades fitting across within and sliding along the conveyer body, and connected to the cable in spaced relationship, and means including a guide rail for the bottom of the blades for guiding the blades back from the discharge end to the initial end of the conveyer body and sheaves for the cable at the ends of its path of travel.

9. A conveyer mechanism including in combination an endless cable traveling in a horizontal path, a conveyer body extending along one reach of the conveyer path and having a bottom and sides, a plurality of blades fitting across within and sliding along the conveyer body, and connected to the cable in spaced relationship, and means including a guide rail for the bottom of the blades for guiding the blades back from the discharge end to the initial end of the conveyer body and horizontally disposed sheaves for the cable at the ends of its path of travel.

10. A conveyer mechanism including in combination an endless cable traveling in a horizontal path, a conveyer body extending along one reach of the conveyer path and having a bottom and sides, a plurality of blades fitting across within and sliding along the conveyer body, and connected to the cable in spaced relationship, and means including a guide rail for the bottom of the blades for guiding the blades back from the discharge end to the initial end of the conveyer body and sheaves for the cable at the ends of its path of travel and having means for engaging the juncture of the cable and blades.

11. A conveyer mechanism including in combination an endless cable traveling in a horizontal path, a conveyer body extending along one reach of the conveyer path and having a bottom and sides, a plurality of blades fitting across within and sliding along the conveyer, and connected to the cable in spaced relationship, means including a guide rail for the bottom of the blades for guiding the blades back from the discharge end to the initial end of the conveyer body, horizontally disposed sheaves for the cable at the ends of its path of travel and having means for engaging the juncture of the cable and blades.

12. A conveyer mechanism including in combination a conveyer body having a bottom and sides which terminate over a place of delivery, a series of blades sliding within the conveyer body, a cable to which the blades are connected and by which they are moved, and guide rails for the blades past the place of delivery.

13. A conveyer mechanism including in combination a conveyer body having a bottom and sides which terminate over a place of delivery, a series of blades sliding within the conveyer body, a cable to which the blades are connected and by which they are moved, and guide rails for the blades past the place of delivery and guiding the blades back into the entry end of the conveyer.

14. A conveyer mechanism for transporting material in a straight or curved path in a horizontal plane, comprising in combination a conveyer body having a bottom and sides, a plurality of L-shaped conveyer blades sliding within the conveyer body, a single, centrally-disposed overhead cable to which the upper central parts of the L-shaped blades are attached, with the horizontal portion of the L-shaped blade in a position to be pressed against the bottom of the conveyer body by the weight of the material being carried, and means engageable with the cable and conveyer blades at their respective junctures and rotatable on a vertical axis, for driving the cable and blades.

15. A conveyer mechanism for transporting intermixed divided materials in a straight or curved path in a horizontal plane, including in combination a conveyer body having a bottom and sides, the bottom terminating over a place of delivery, a plurality of L-shaped conveyer blades slidable within the conveyer body, with the horizontal portion of the L-shaped blades substantially parallel to the bottom of the conveyer, whereby the weight of the materials press on this horizontal portion, and so hold the blades in position, a single, centrally-disposed overhead cable to which the blades are attached, means for driving the cable, and means for guiding the blades back into the conveyer body after they have passed over the place of delivery.

In testimony whereof, I have signed my name to this specification.

RICHARD PEALE.